United States Patent
Takanashi et al.

(10) Patent No.: US 8,899,602 B2
(45) Date of Patent: Dec. 2, 2014

(54) VEHICLE SUSPENSION SUPPORT STRUCTURE

(75) Inventors: Yoko Takanashi, Hiroshima (JP);
Masashi Ando, Fukuyama (JP);
Toshiyuki Yokota, Okayama (JP)

(73) Assignees: Mazda Motor Corporation, Hiroshima (JP); Hiruta Kogyo Co., Ltd., Okayama (JP); Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 13/823,647

(22) PCT Filed: Oct. 14, 2011

(86) PCT No.: PCT/JP2011/005761
§ 371 (c)(1),
(2), (4) Date: Mar. 14, 2013

(87) PCT Pub. No.: WO2012/049857
PCT Pub. Date: Apr. 19, 2012

(65) Prior Publication Data
US 2013/0168938 A1 Jul. 4, 2013

(30) Foreign Application Priority Data

Oct. 14, 2010 (JP) ................. 2010-231388

(51) Int. Cl.
*B60G 3/04* (2006.01)
*B60G 7/00* (2006.01)
*B60G 99/00* (2010.01)
*B60G 13/00* (2006.01)

(52) U.S. Cl.
CPC .......... *B60G 99/00* (2013.01); *B60G 2204/129* (2013.01); *B60G 7/001* (2013.01); *B60G 2206/122* (2013.01); *B60G 2206/124* (2013.01); *B60G 13/005* (2013.01)

USPC ...... 280/124.134; 280/124.135; 280/124.145; 29/897.2

(58) Field of Classification Search
USPC ......... 280/124.1, 124.134, 124.135, 124.145, 280/124.146, 124.147, 124.154, 124.155; 29/897.2
See application file for complete search history.

(56) References Cited

U.S. PATENT DOCUMENTS 4,377,298 A * 3/1983 Finn et al. .............. 280/124.142
4,570,968 A 2/1986 Mukai et al.
(Continued)

FOREIGN PATENT DOCUMENTS

JP 61-048443 A 10/1986
JP 09-193635 A 7/1997
(Continued)

OTHER PUBLICATIONS

International Search Report; PCT/JP2011/005761; Dec. 6, 2011.

*Primary Examiner* — Ruth Ilan
*Assistant Examiner* — Barry Gooden, Jr.
(74) *Attorney, Agent, or Firm* — Studebaker & Brackett PC

(57) ABSTRACT

A vehicle suspension support structure including a lower arm (17) formed by, for example, a lower arm 17 rotatably supporting a knuckle for a front wheel, and a shock absorber attenuating vibration of the lower arm (17), wherein a lower end of the shock absorber is rotatably supported by a support bracket 32 that is welded to an upper face of the lower arm (17) formed by, for example, the lower arm 17, and wherein in the upper face of the lower arm (17), a bulged portion 40 is formed where a weld target portion to which an end of the support bracket 32 is welded is formed to bulge upwards as compared to the periphery thereof.

7 Claims, 12 Drawing Sheets

(56) References Cited

U.S. PATENT DOCUMENTS

| | | | |
|---|---|---|---|
| 5,782,484 A * | 7/1998 | Kuhn, Jr. | 280/124.142 |
| 7,322,591 B2 * | 1/2008 | Seki | 280/124.152 |
| 7,571,918 B2 * | 8/2009 | Bowers | 280/124.138 |
| 7,793,954 B2 * | 9/2010 | Kucinski et al. | 280/124.134 |
| 7,934,735 B2 * | 5/2011 | Kuwabara | 280/124.134 |
| 7,980,576 B2 * | 7/2011 | Inoue et al. | 280/124.121 |
| 8,356,826 B2 * | 1/2013 | Kucinski et al. | 280/124.134 |
| 2002/0074760 A1 | 6/2002 | Eshelman | |
| 2004/0021286 A1 | 2/2004 | Bombardier | |
| 2007/0018419 A1 * | 1/2007 | Kinouchi et al. | 280/124.134 |
| 2009/0295113 A1 | 12/2009 | Inoue et al. | |
| 2011/0025012 A1 * | 2/2011 | Nakamura | 280/124.135 |

FOREIGN PATENT DOCUMENTS

| | | |
|---|---|---|
| JP | 2004-202565 A | 7/2004 |
| JP | 2007-062675 A | 3/2007 |
| JP | 2007-090958 A | 4/2007 |

\* cited by examiner

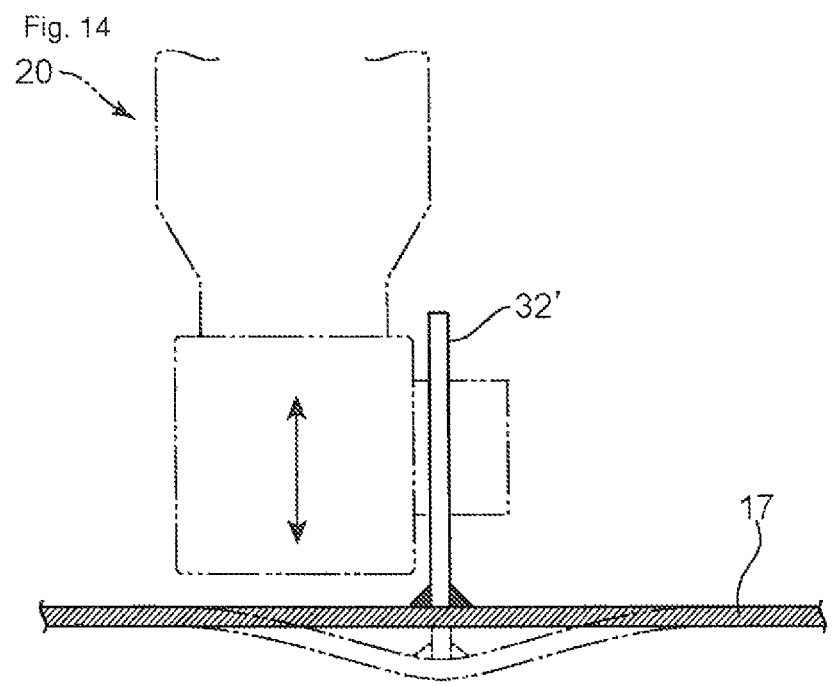
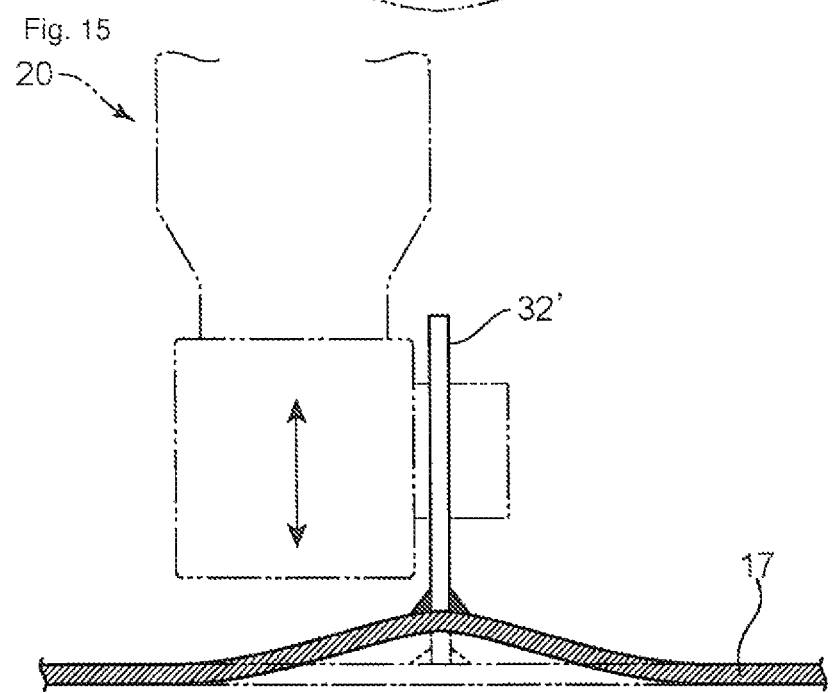

VEHICLE SUSPENSION SUPPORT STRUCTURE

TECHNICAL FIELD

The present invention relates to a vehicle suspension support structure including a suspension member (lower arm) rotatably supporting a knuckle for a front wheel and a shock absorber attenuating vibration of the suspension member.

BACKGROUND ART

Conventionally, it has been aimed to provide a vehicle suspension support structure that allows durable and accurate fastening of a shock absorber without incurring an increase in the number of components or assembling steps, and Patent Literature 1 listed below shows one such example. Namely, the suspension support structure of Patent Literature 1 includes a shock absorber coupled at a lower end thereof to a suspension support member on the vehicle side via a suspension arm member, a shock absorber bracket consisting of an upward wall portion formed with a mounting hole at the center and a tubular portion extending downwardly from an outer periphery of the upward wall portion and fixedly attached to the suspension support member, and an inverted cup-shaped portion formed with a centering hole concentric with the mounting hole and a penetrated portion that surrounds the centering hole and can abut on the upward wall portion. The suspension support structure further includes a centering bracket formed by fixedly attaching a lower end of the inverted cup-shaped portion covered over the upward wall portion to an outer circumferential wall of the tubular portion. An upper end fastening member of the shock absorber is passed through the mounting hole and the centering hole and fastened.

CITATION LIST

Patent Literature

[PTL 1]
JP9-193635A

SUMMARY OF INVENTION

Technical Problem

The vehicle suspension support structure disclosed in Patent Literature 1 above is configured such that the lower end of the shock absorber, which has the function of supplying a load input from the wheels, is rotatably mounted to an intermediate reinforcing bar provided to a lower arm (suspension arm member). The lower arm is configured to displace in a pivotal manner in accordance with the load input from the wheels to absorb the load by transmitting the load to the lower end of the shock absorber, because of which the support member supporting the lower end of the shock absorber is repeatedly subjected to the load in the up and down direction. Therefore, if this support member is welded to the lower arm, it is necessary to secure sufficient strength to withstand the load repeatedly input to a welded end thereof so as to effectively prevent a fatigue fracture thereof.

It is also the practice to fasten a support bracket supporting the lower end of the shock absorber to an upper face of the lower arm with a mounting bolt instead of welding the support member to the lower arm. In this case, however, it is necessary to prevent the lower end of the shock absorber from interfering with the head or the like of the mounting bolt for fastening a base plate of the support bracket arranged on the upper face of the lower arm, because of which the lower end of the shock absorber could not be disposed low, making it difficult to install the shock absorber having a predetermined length in a compact manner.

The present invention was devised in view of the above problems, with an object to provide a vehicle suspension support structure that can secure sufficient strength to withstand a load repeatedly input to a support bracket supporting the lower end of a shock absorber, with a simple and compact configuration.

Solution to Problem

To solve the problem described above, the present invention resides in a suspension support structure, including:
a lower arm rotatably supporting a knuckle for a front wheel;
a shock absorber attenuating vibration of the lower arm; and
a support bracket welded to an upper face of the lower arm, wherein
the support bracket rotatably supports a lower end of the shock absorber,
in the upper face of the lower arm,
a weld target portion is formed to which an end of the support bracket is welded, and
a bulged portion bulged upwards is formed in an area containing part of the weld target portion.

The configuration described above is advantageous in that the rigidity of the weld target portion for the end of the support bracket can effectively be enhanced, and since flexure thereof during pivotal displacement of the lower arm is prevented, a fatigue fracture in the welded end of the support bracket is effectively prevented.

BRIEF DESCRIPTION OF DRAWINGS

FIG. 14 is an explanatory view showing a reference example of a suspension support structure.
FIG. 15 is an explanatory view showing a vibrating state of a support bracket in the reference example.

DESCRIPTION OF EMBODIMENTS

Figure 1:
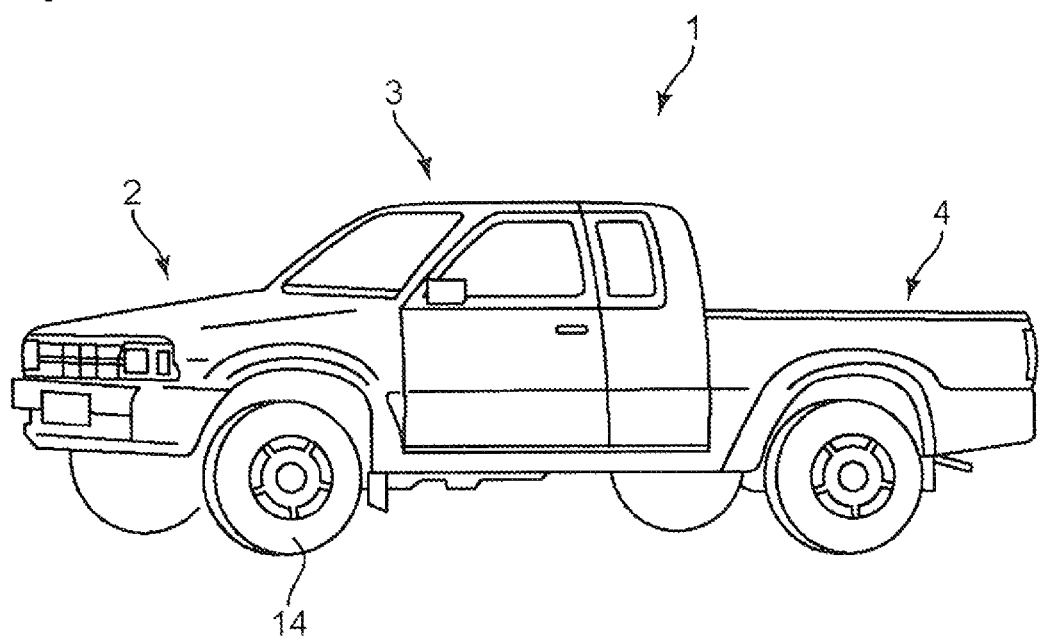
FIG. 1 is a perspective view showing the entire configuration of a vehicle equipped with the suspension support structure according to the present invention.
Figure 2:
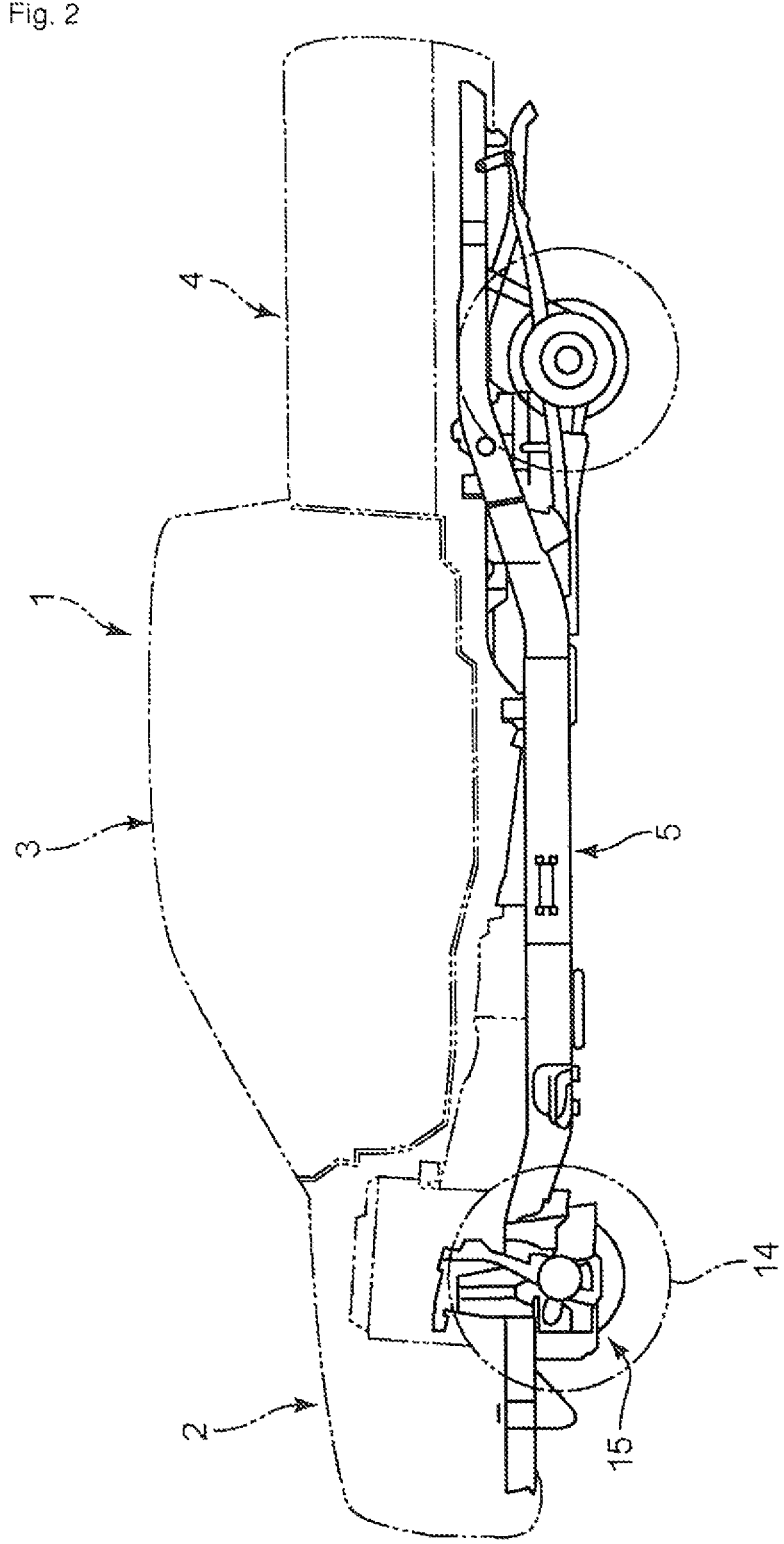
FIG. 2 is a side view showing the structure of a chassis frame of the vehicle.
Figure 3:
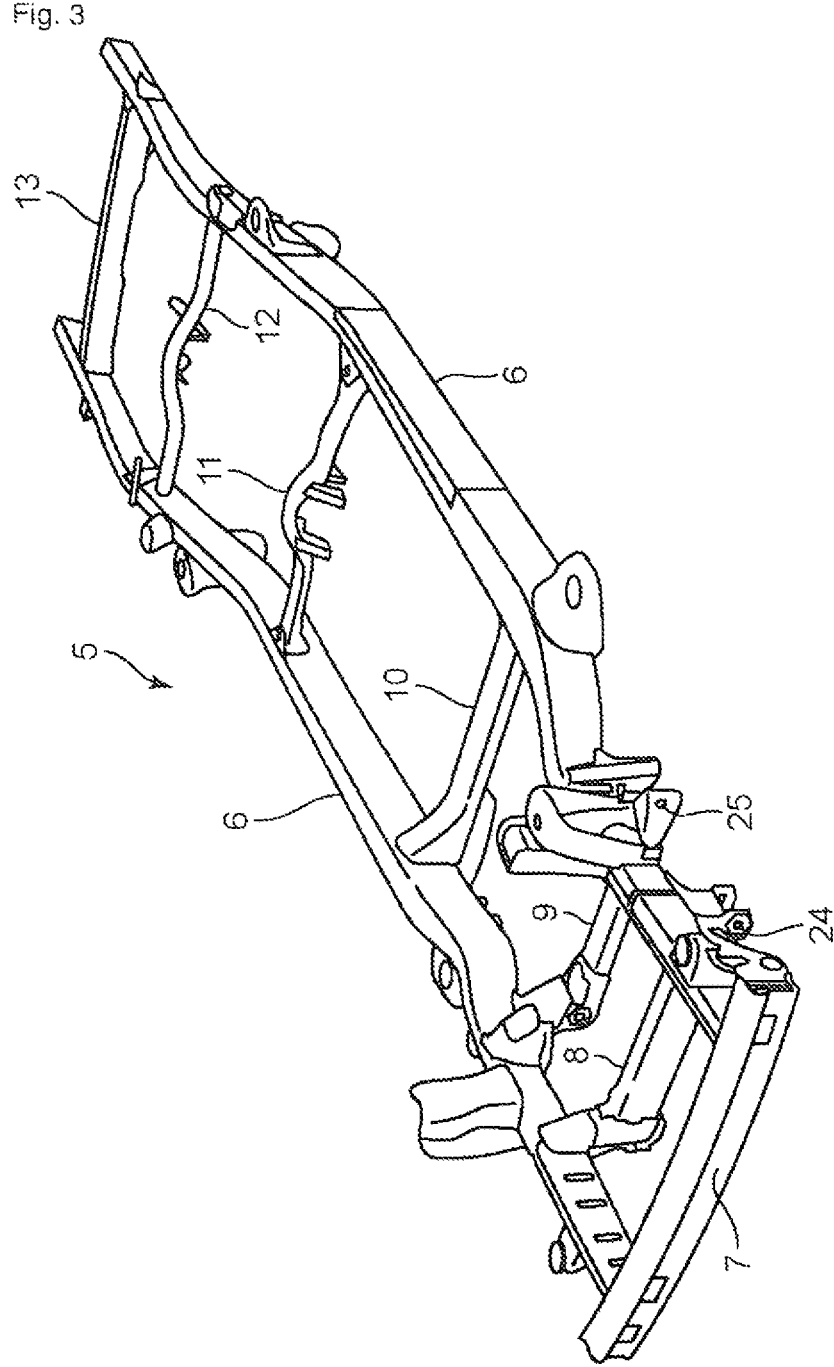
FIG. 3 is a perspective view showing the structure of the chassis frame of the vehicle.
Figure 4:
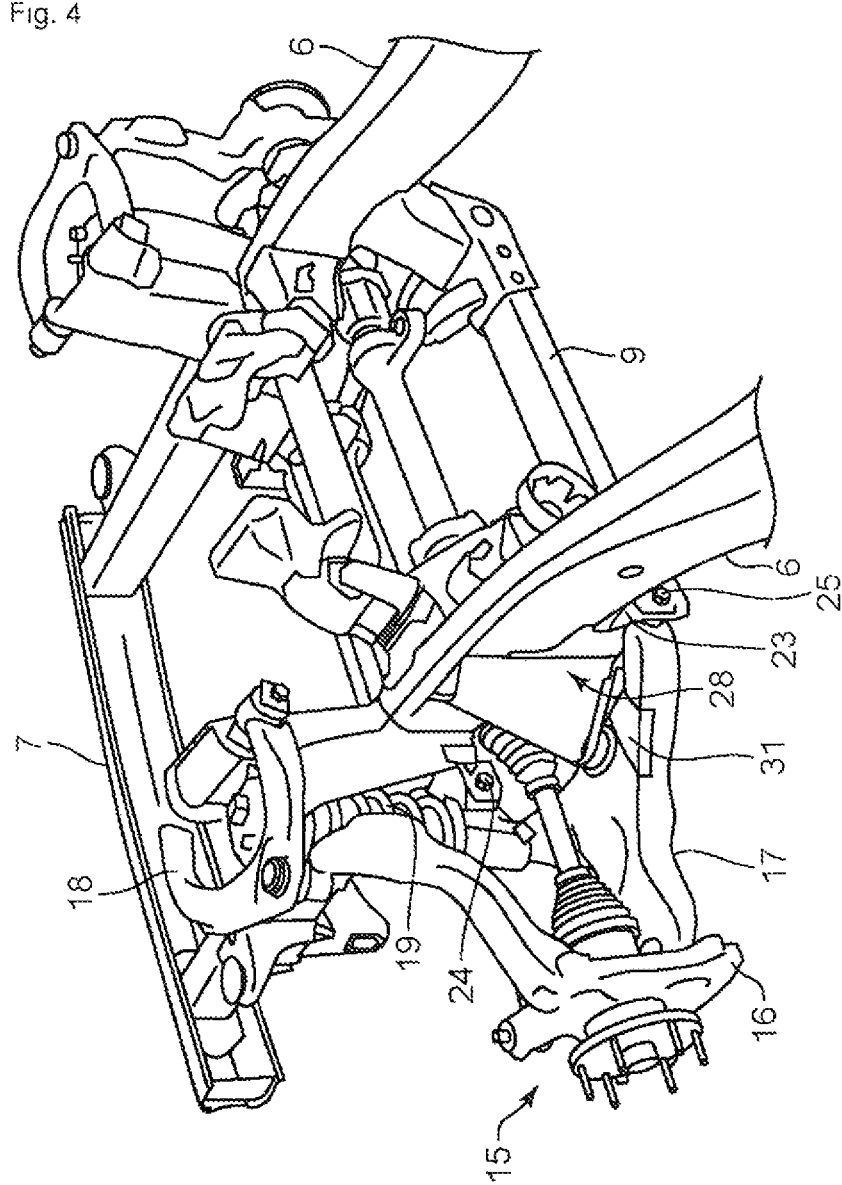
FIG. 4 is a perspective view showing a suspension device mounted to the vehicle viewed diagonally from behind.
Figure 5:
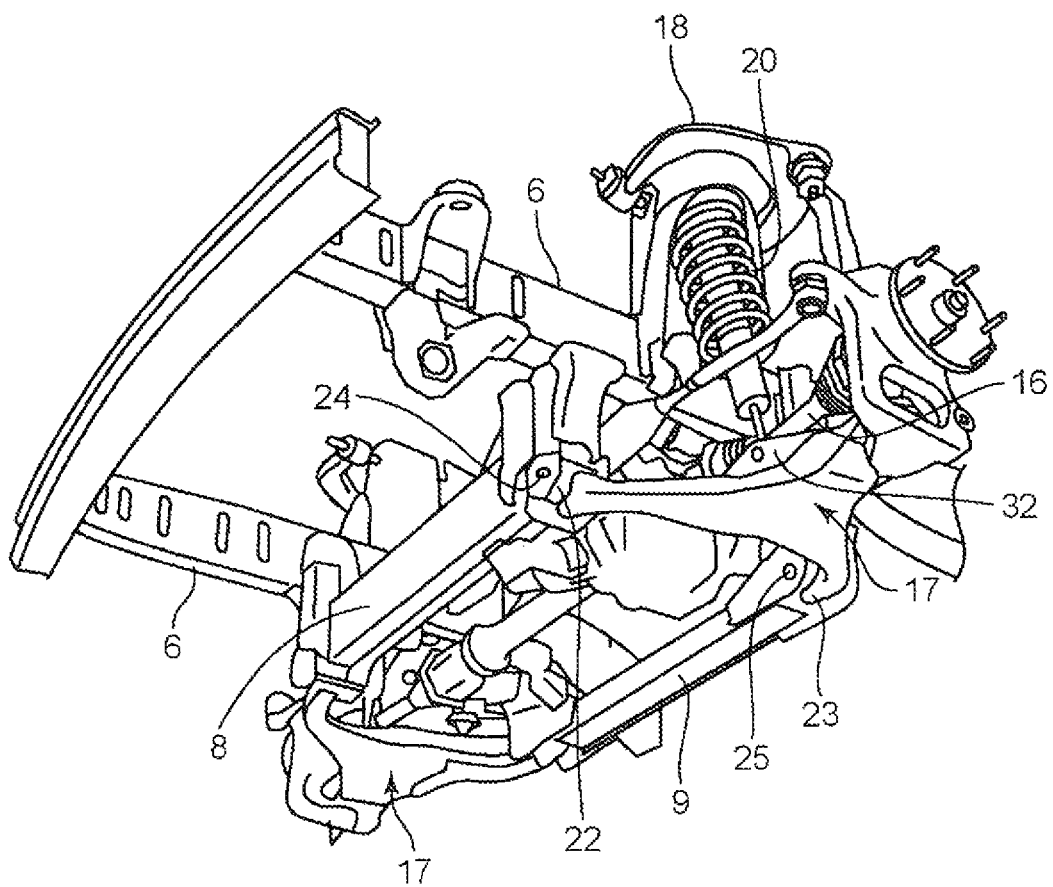
FIG. 5 is a perspective view showing the suspension device viewed diagonally from below.
Figure 6:
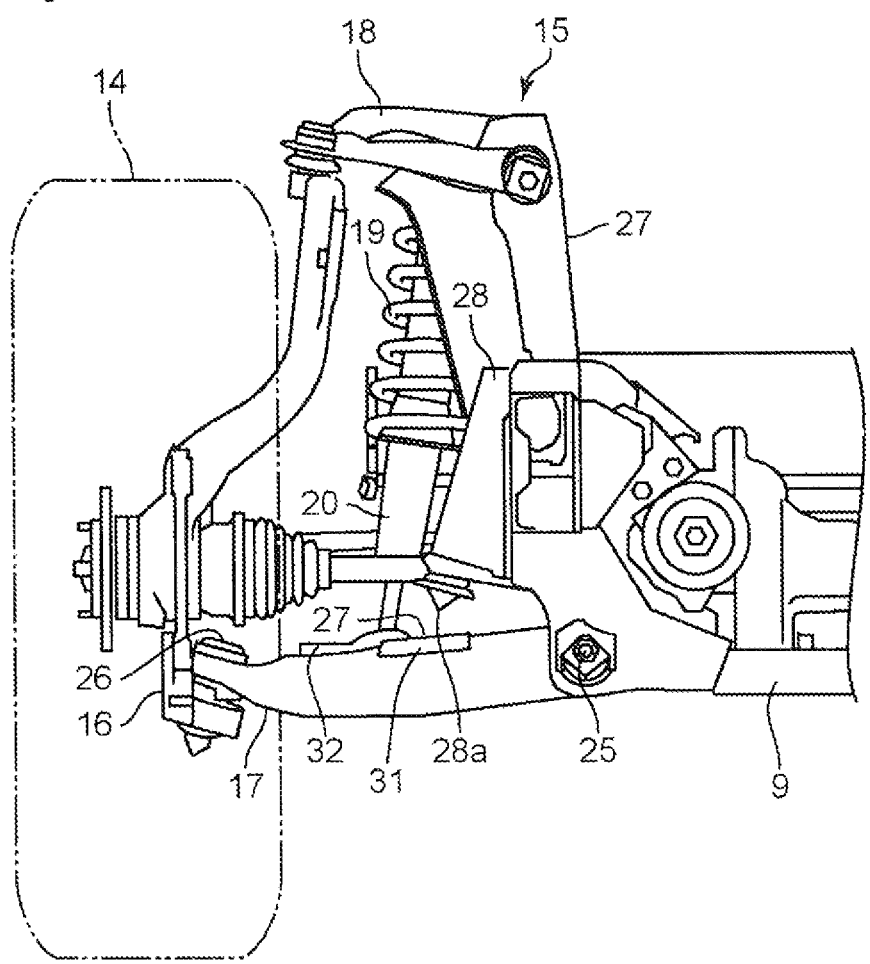
FIG. 6 is a back view of the suspension device.

FIG. 1 to FIG. 4 show the entire configuration of a vehicle 1 which is a small truck equipped with the vehicle suspension support structure according to one embodiment of the present invention. The vehicle 1 includes an engine room 2, a cabin 3, and a pickup bed 4, which are all carried on a chassis frame 5. The chassis frame 5 is formed in a ladder shape in plan view, with a pair of left and right side frames 6 extending in the front to back direction of the vehicle 1 and a plurality of cross members 7 to 13 extending in the vehicle width direction such as to connect the left and right side frames 6.

Suspension devices 15 for front wheels 14 are disposed in a front part of the chassis frame 5, as shown in FIG. 5 to FIG. 9. This suspension device 15 is generally known as a high mount type, double wishbone suspension, including a knuckle 16 rotatably supporting a front wheel 14, a lower arm 17 supporting a lower part thereof, an upper arm 18 supporting an upper part of the knuckle 16, a suspension coil spring 19 and a shock absorber 20 for attenuating the up and down vibration input from the front wheel 14 and a stabilizer 21 suppressing the tilt of the vehicle body.

The lower arm 17 has bifurcated proximal ends 22 and 23, and supported such as to be pivotally displaceable around, as fulcrums, a support shaft 24 pivotally supporting the front-side proximal end 22 to a cross member 8 and around a pivotal support shaft 25 pivotally supporting the rear-side proximal end 23 to a cross member 9. The distal end (outer end in the vehicle width direction) of the lower arm 17 is coupled to the knuckle 16 via a ball joint 26.

On an outer side face of the side frame 6 is provided a suspension tower 27 for supporting upper ends of the suspension coil spring 19 and the shock absorber 20, to the rear of which is mounted a bump stopper 28 for restricting upward movement of the lower arm 17. A rubber-made abutment portion 28a is provided to the lower end of the bump stopper 28, which will abut on an upper face of a rear part of the lower arm 17 to restrict upward movement thereof. The lower arm 17 is made of a hollow member formed by joining an upper plate 29 and a lower plate 30. To an upper face in a rear part thereof is welded a backing plate 31 for protecting the portion that makes contact with the abutment portion 28a of the bump stopper 28.

A support bracket 32 supporting the lower end of the shock absorber 20 is secured by welding to the upper face of the lower arm 17. This support bracket 32 includes a pair of front and rear upright plates 35 and 36, in which through holes 34 are formed for a pivotal support shaft 33 pivotally supporting the lower end of the shock absorber 20, the lower sides of the upright plates 35 and 36 being fixedly attached to the upper face of the lower arm 17 by arc welding or the like.

Figure 10:
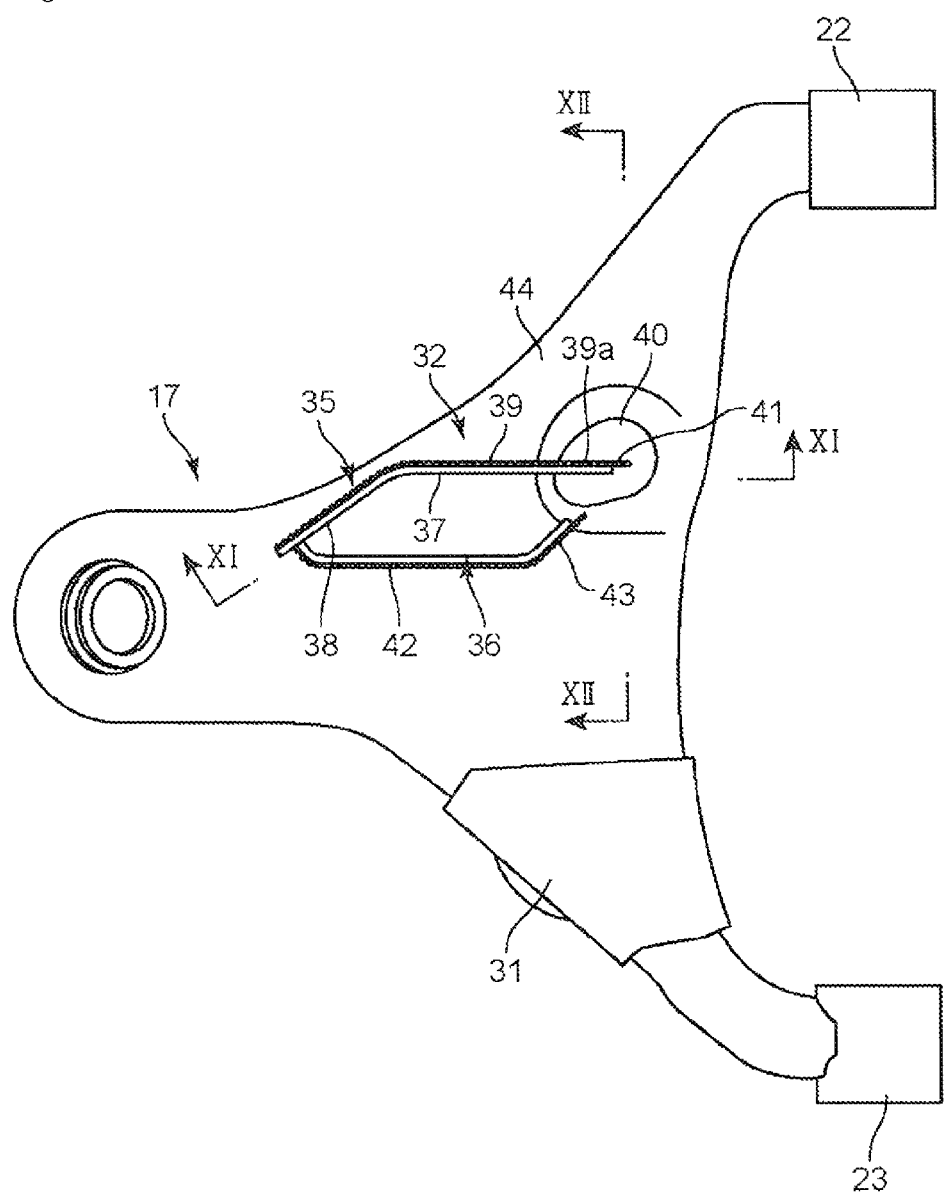
FIG. 10 is a plan view showing a specific configuration of a lower arm.
Figure 11:
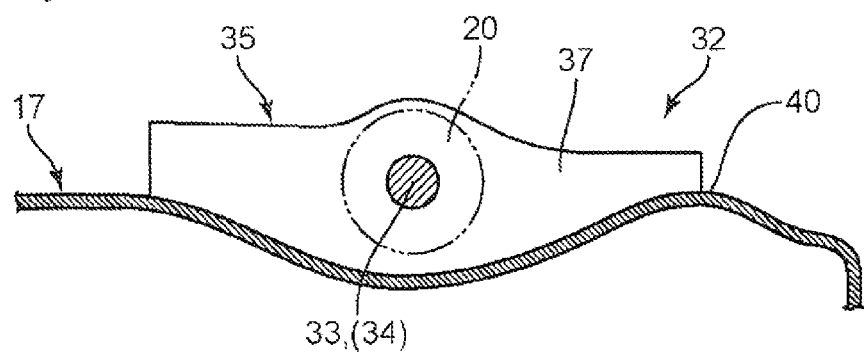
FIG. 11 is a cross-sectional view along XI-XI of FIG. 10.
Figure 12:
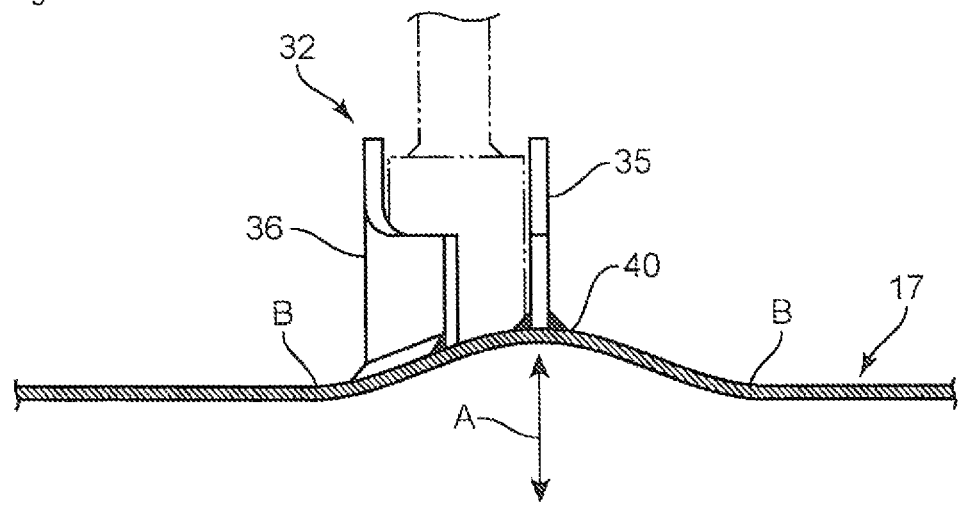
FIG. 12 is a cross-sectional view along XII-XII of FIG. 10.
Figure 13:
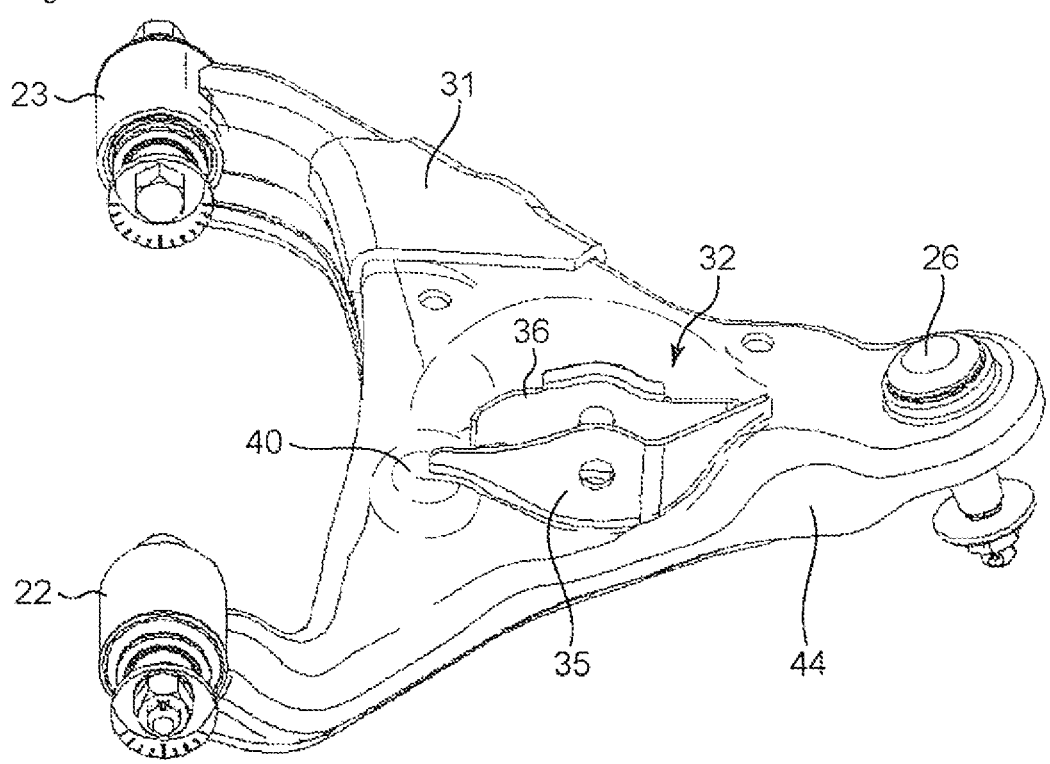
FIG. 13 is a perspective view showing a specific configuration of the lower arm.

The front-side upright plate 35, in plan view shown in FIG. 10, is configured to have a linear portion 37 extending in the vehicle width direction from the proximal end side to the distal end side of the lower arm 17, and an inclined portion 38 extending from the outer end in the vehicle width direction of the linear portion diagonally to the rear. In the upper face of the lower arm 17 is formed, as shown in FIG. 11 to FIG. 13, a bulged portion 40 where a weld target portion 39a, to which the proximal end of the upright plate 35, i.e., an inner end in the vehicle width direction of the linear portion 37 is welded, is bulged upwards over a predetermined area as compared to the periphery thereof. Additional beads 41 are formed to extend inwards in the vehicle width direction beyond the proximal end of the upright plate 35 in the upper face of the bulged portion 40.

The rear-side upright plate 36, in plan view shown in FIG. 10, is configured to have a linear portion 42 extending in the vehicle width direction from the distal end side to the proximal end side of the lower arm 17, and an inclined portion 43 extending from the inner end in the vehicle width direction of the linear portion diagonally to the front. The distal end of the upright plate 36, i.e., the outer end in the vehicle width direction of the linear portion 42, is abutted to the distal end of the upright plate 35 and welded to the upper face of the lower arm 17. The proximal end of the upright plate 36, i.e., the inner end in the vehicle width direction of the inclined portion 43, is welded to the top of a peripheral portion of the bulged portion 40.

Figure 7:
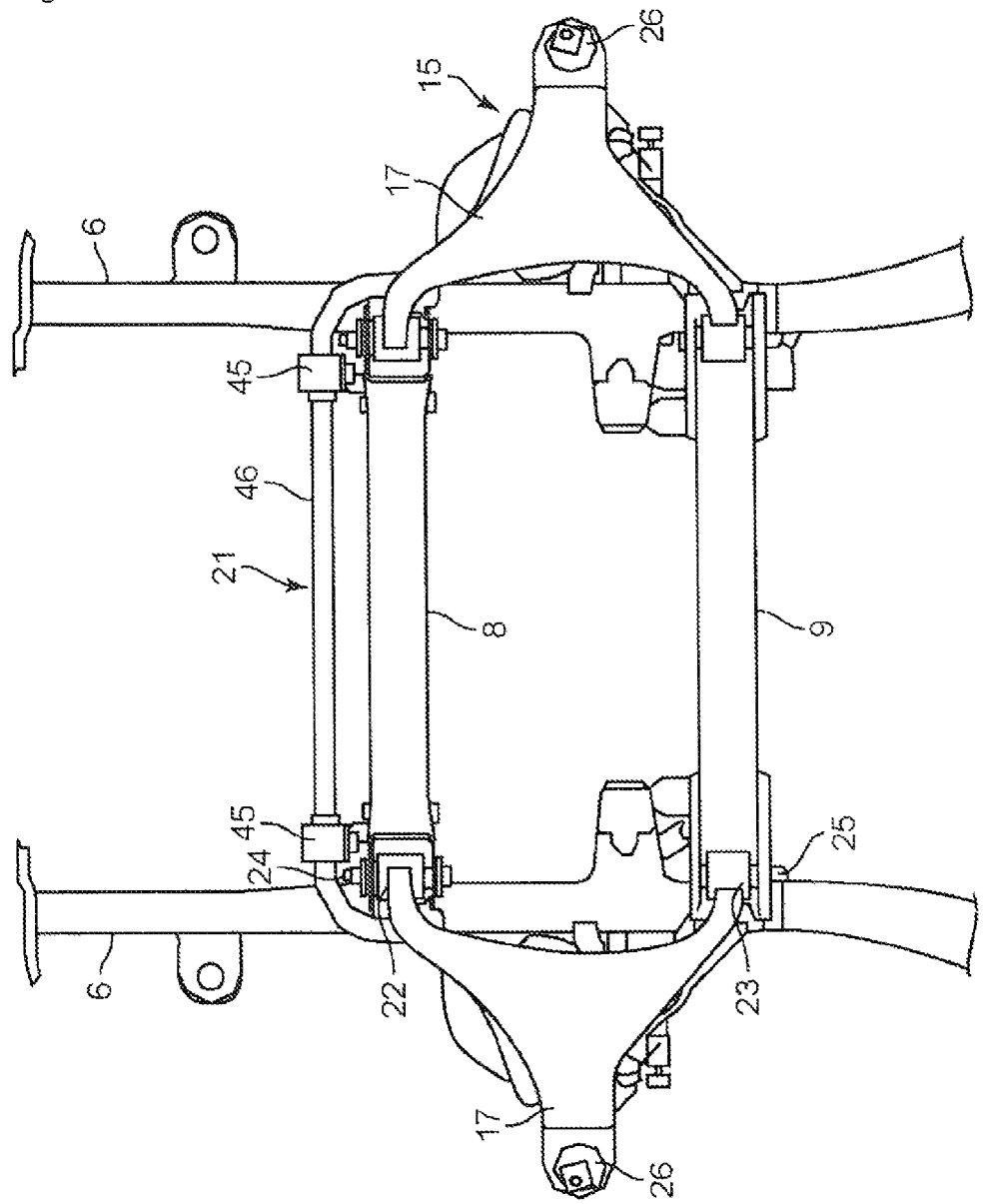
FIG. 7 is a bottom view of the suspension device.
Figure 8:
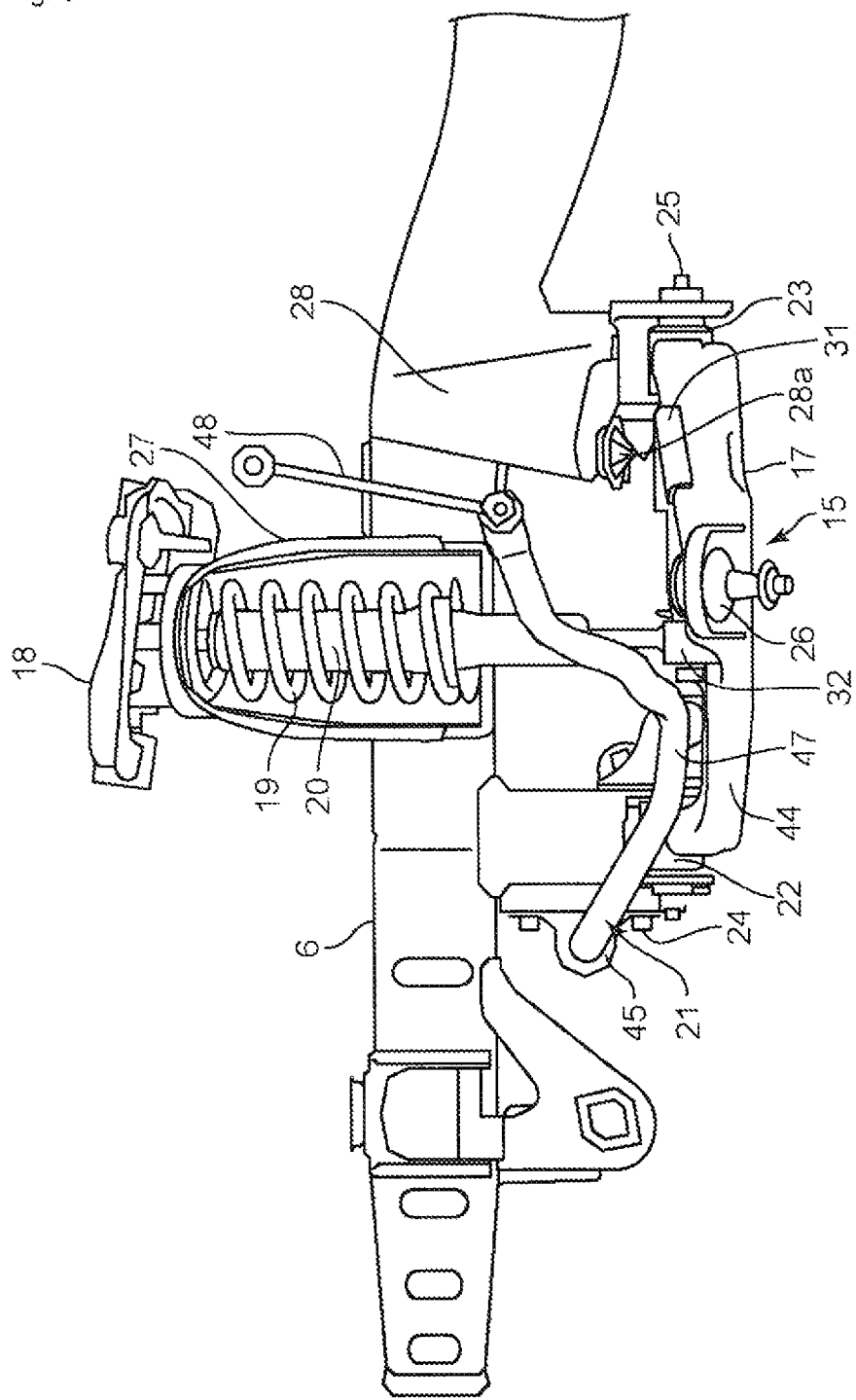
FIG. 8 is a side view of the suspension device.
Figure 9:
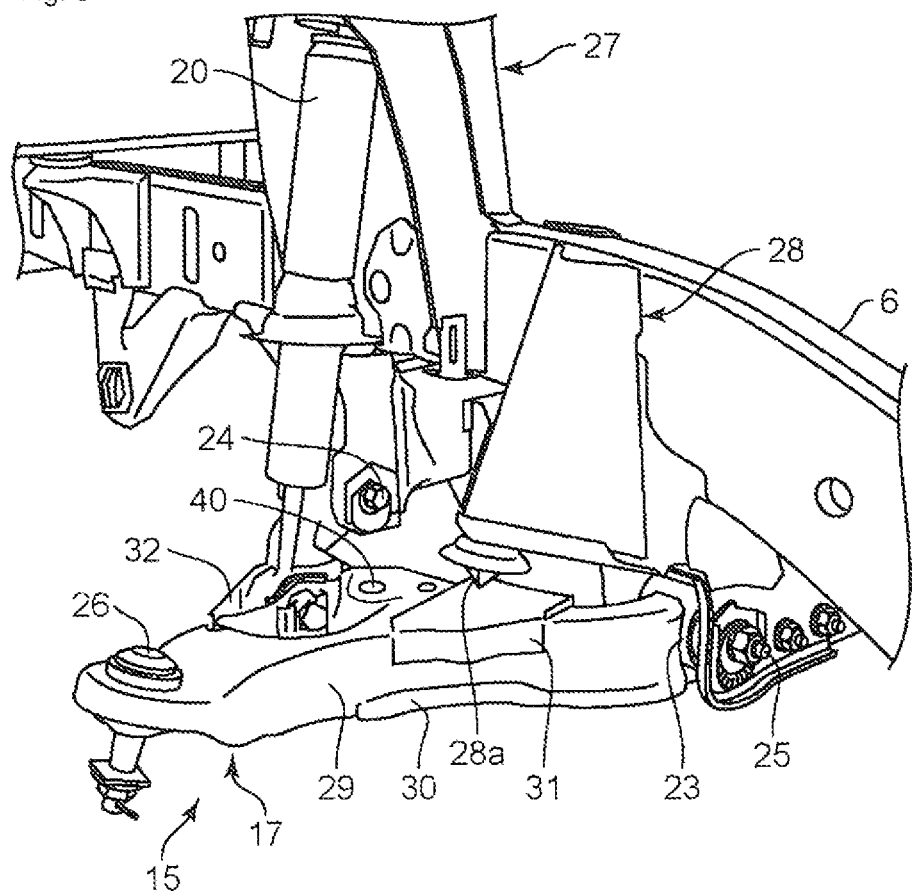
FIG. 9 is a perspective view of the suspension device.

A stabilizer 21 includes a stabilizer main body 46 rotatably supported by a pair of left and right support parts 45 provided on the front face of a cross member 8, and extended portions 47 extended diagonally rearward from the left and right ends thereof, as shown in FIG. 7 and FIG. 8, and side ends of the extended portions 47 are coupled to the knuckles 16 via coupling links 48. A bent portion bent downward to run along the upper face of a front portion of the lower arm 17 is provided to the extended portions 47 of the stabilizer 21. In the upper face of the front portion of the lower arm 17 is formed an interference avoidance portion 44 with a lower installation height than the periphery thereof, whereby interference between the extended portion 47 of the stabilizer 21 and the lower arm 17 is prevented.

In the suspension support structure of the vehicle 1 including the suspension member formed of the lower arm 17 rotatably supporting the knuckle 16 for the front wheel, and the shock absorber 20 attenuating vibration of the lower arm 17 as described above, the lower end of the shock absorber 20 is rotatably supported by the support bracket 32 welded to the upper face of the lower arm 17, and the bulged portion 40 is formed in the upper face of the lower arm 17 where the weld target portion, to which the proximal end of the support bracket 32 is welded, is bulged upwards as compared to the periphery thereof, which is advantageous in that sufficient strength is secured to withstand the load repeatedly input to the support bracket 32 supporting the lower end of the shock absorber 20, with a simple and compact configuration.

Namely, as the load or up and down vibration is input to the distal end of the lower arm 17 via the knuckle 16 from the front wheel 14 when the vehicle 1 is running, the lower arm 17 displaces in a pivotal manner around the pivotal support shaft 25 as the fulcrum, while the central portion in the vehicle width direction of the lower arm 17 is supported by the suspension coil spring 19 and the shock absorber 20.

This pivotal displacement causes a vibration load to be applied in a direction in which the weld target portion 39 of the support bracket 32 moves up and down. If the bulged portion 40 is not provided and the proximal end of the support bracket 32' is welded to a flat surface portion of the lower arm 17 as shown in FIG. 14, the weld target portion of the support bracket 32' will vibrate up and down in response to the pivotal displacement of the lower arm 17 as indicated by phantom lines in FIG. 14 and solid lines in FIG. 15. This causes a compressive load and a tensile load to be repeatedly applied to the welded end of the support bracket 32', which may lead to a fatigue fracture in the welded end and may generate a crack in the welded end of the support bracket 32'.

In contrast, if the bulged portion 40 is formed in the upper face of the lower arm 17, to which the proximal end of the support bracket 32 is welded, as described above, the rigidity of the weld target portion of the support bracket 32 can be enhanced as compared to the periphery thereof, and an elastic deformation of base ends B or the like of the bulged portion 40 in accordance with the load input in the direction in which the welded end of the support bracket 32 is pivotally displaced as shown by the arrow A in FIG. 12 can restrict deformation of the weld target portion of the support bracket 32 welded to the upper face of the bulged portion 40. This can effectively prevent the load that may generate cracks in the welded end of the support bracket 32 from being repeatedly applied.

Accordingly, in the suspension support structure of the vehicle 1 in which the support bracket 32 is welded to the upper face of the lower arm 17 in order for the lower end of the shock absorber 20 to be disposed higher as compared to the design where a base plate of the support bracket for supporting the lower end of the shock absorber 20 is fastened by a mounting bolt to the upper face of the lower arm, this is advantageous in that repeated application of load that may cause a fatigue fracture in the welded end of the support bracket 32 is effectively reduced and that formation of cracks or the like in the welded end can be reliably prevented.

In particular, as shown in FIG. 10 and FIG. 11, if the central portions in the vehicle width direction of the pair of upright plates 35 and 36 forming the support bracket 32 are bulged downwards, and correspondingly the upper face of the lower arm 17 is dented downwards, it is advantageous in that, location of the through holes 34 for the pivotal support shaft 33 pivotally supporting the lower end of the shock absorber 20 at a lower position in the upright plates 35 and 36 will enable the lower end of the shock absorber 20 to be located lower without interfering with the upper face of the lower arm 17 while the entire length of the shock absorber 20 is made sufficiently large, so that the shock absorber 20 having a predetermined length can be compactly installed.

In the embodiment described above, the support bracket 32 is formed by the pair of upright plates 35 and 36 provided with a pivotal support part formed by the through holes 34 for the pivotal support shaft 33 pivotally supporting the lower end of the shock absorber 20, the proximal ends of both upright plates 35 and 36 each being welded to the bulged portion 40, which has an advantage over the case where only one of the upright plates 35 and 36 is welded to the bulged portion 40 in that repeated application of load that may cause a fatigue fracture in the welded end of the support bracket 32 is more effectively reduced and that formation of cracks or the like in the welded end can be more reliably prevented.

Furthermore, in the embodiment described above, the interference avoidance portion 44 is formed with a lower installation height than the periphery thereof in the upper face of a front portion of the lower arm 17 in order to avoid interference with the stabilizer 21 installed such as to extend in the vehicle width direction above the lower arm forming the suspension member, which is advantageous in that the stabilizer 21 can be adequately disposed without interfering with the upper face of the lower arm 17, while the effect of achieving sufficient support strength for the support bracket 32 by formation of the bulged portion 40 in the upper face of the lower arm 17 is maintained.

It is advantageous if, as shown in the embodiment described above, additional weld beads 41 made beyond the proximal end of the support bracket 32 are formed in the upper face of the lower arm 17 forming the suspension member, as stress concentration in the proximal end of the support bracket 32 welded to the upper face of the lower arm 17 can be effectively prevented so that a fatigue fracture in the welded end of the support bracket 32 can be even more reliably prevented.

While one example was described in the embodiment described above in which the bulged portion 40 is formed only in the weld target portion where the proximal end of the support bracket 32 is welded in the upper face of the lower arm 17, in an alternative configuration, a similar bulged portion may be formed in a weld target portion to which a distal end, i.e., the outer end in the vehicle width direction, of the support bracket 32 is welded, with the distal end of the support bracket 32 welded to this bulged portion, and additional weld beads made beyond the distal end of the support bracket 32 may be formed in the upper face of the lower arm 17.

[Summary of the Embodiment]

The present invention resides in a suspension support structure, including:

a lower arm (17) rotatably supporting a knuckle (16) for a front wheel;

a shock absorber (20) attenuating vibration of the lower arm (17); and a support bracket (32) welded to an upper face of the lower arm (17), wherein the support bracket (32) rotatably supports a lower end of the shock absorber (20), and in the upper face of the lower arm (17), a weld target portion (39) is formed, to which an end of the support bracket (32) is welded, and a bulged portion (40) bulged upwards is formed in an area containing part of the weld target portion (39).

The configuration described above can effectively enhance the rigidity of the weld target portion for the end of the support bracket, which is advantageous since flexure thereof during pivotal displacement of the lower arm is prevented, whereby a fatigue fracture in the welded end of the support bracket is effectively prevented.

In the suspension support structure described above, the support bracket (32) includes a pair of upright plates (35, 36) formed with a pivotal support portion (33, 34) for the shock absorber (20), respective ends of both upright plates (35, 36) being welded to the bulged portion (40).

The configuration described above can more effectively reduce repeated application of load that may cause a fatigue fracture in the welded end of the support bracket as compared to the case where only one of both upright plates is welded to the bulged portion, so that formation of cracks or the like in the welded end can reliably be prevented.

In the suspension support structure described above, a stabilizer (21) is installed above the lower arm (17) so as to extend in a vehicle width direction, and an interference avoidance portion (44) is formed in the lower arm (17) at a position away from the bulged portion (40) so as to avoid interference with the stabilizer (21).

The configuration described above is advantageous in that the stabilizer can be adequately disposed without interference between the upper face of the lower arm and an extended portion of the stabilizer, while the effect of achieving sufficient support strength for the support bracket by formation of the bulged portion in the upper face of the lower arm is maintained.

In the suspension support structure described above, an additional weld bead (41) formed by welding beyond the end of the support bracket (32) is formed in the upper face of the lower arm (17).

The configuration described above is advantageous in that stress concentration in the welded end of the support bracket welded to the upper face of the lower arm (17) can be effectively prevented so that a fatigue fracture in the welded end of the support bracket can be even more reliably prevented.

Furthermore, the support bracket (32) includes a first upright plate (35) disposed on a front side in a vehicle direction, and a second upright plate (36) disposed on a rear side in the vehicle direction, (a lower end of) an inner end in a vehicle width direction of the first upright plate and (a lower end of) an inner end in the vehicle width direction of the second upright plate each being welded to the bulged portion (40).

Furthermore, in the upper face of the lower arm (17), an inner weld target portion may be formed, to which the inner ends in the vehicle width direction of the first upright plate (35) and the second upright plate (36) are welded, and an outer weld target portion may be formed to which outer ends in the vehicle width direction of the first upright plate and the second upright plate are welded, and wherein the inner weld target portion and the outer weld target portion may be configured in a shape bulged upwards as compared to other weld target portions.

Also, in the upper face of the lower arm (17), inner additional weld beads may be formed, by welding beyond the respective inner ends in the vehicle width direction of the first upright plate (35) and the second upright plate (36), and outer additional weld beads may be formed by welding beyond the respective outer ends in the vehicle width direction of the first upright plate (35) and the second upright plate (36).

This application is based on Japanese Patent Application Serial No. 2010-231388 filed in Japan Patent Office on Oct. 14, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A suspension support structure, comprising:
   a lower arm, having an upper surface, rotatably supporting a knuckle for a front wheel;
   a bulged portion bulged upwards relative to a periphery thereof and formed on the upper surface of the lower arm, the bulged portion is formed in an area on the upper surface of the lower arm containing a part of a weld target portion,
   a shock absorber attenuating vibration of the lower arm; and
   a support bracket having a proximal end welded to the weld target portion on the bulged portion, wherein
   the support bracket rotatably supports a lower end of the shock absorber, and
   wherein the support bracket includes a pair of upright plates formed with a pivotal support portion for the shock absorber, and respective ends of both of the upright plates being directly welded to the weld target portion of the bulged portion.

2. The suspension support structure for a vehicle according to claim 1, wherein an additional weld bead formed by welding beyond the end of the support bracket is formed on the upper face of the lower arm.

3. The suspension support structure for a vehicle according to claim 1, wherein a stabilizer is installed above the lower arm so as to extend in a vehicle width direction, and wherein an interference avoidance portion is formed in the lower arm at a position away from the bulged portion so as to avoid interference with the stabilizer.

4. The suspension support structure for a vehicle according to claim 3, wherein an additional weld bead formed by welding beyond the end of the support bracket is formed on the upper face of the lower arm.

5. The suspension support structure for a vehicle according to claim 1, wherein the upright plates are composed of a first upright plate disposed on a front side in a vehicle direction, and a second upright plate disposed on a rear side in the vehicle direction, an inner end in a vehicle width direction of the first upright plate and an inner end in the vehicle width direction of the second upright plate each being welded to the bulged portion.

6. The suspension support structure for a vehicle according to claim 5, wherein
   the weld target portion is an inner weld target portion formed to which the inner ends in the vehicle width direction of the first upright plate and the second upright plate are welded,
   on the upper face of the lower arm,
   an outer weld target portion is formed to which outer ends in the vehicle width direction of the first upright plate and the second upright plate are welded, and wherein
   the inner weld target portion and the outer weld target portion are configured in a shape bulged upwards.

7. The suspension support structure for a vehicle according to claim 5, wherein on the upper face of the lower arm, inner additional weld beads are formed by welding beyond the respective inner ends in the vehicle width direction of the first upright plate and the second upright plate, and outer additional weld beads are formed by welding beyond the respective outer ends in the vehicle width direction of the first upright plate and the second upright plate.

* * * * *